N. SARGENT.
Sugar Mill.
No. 1,783.
Patented Sept. 10, 1840.
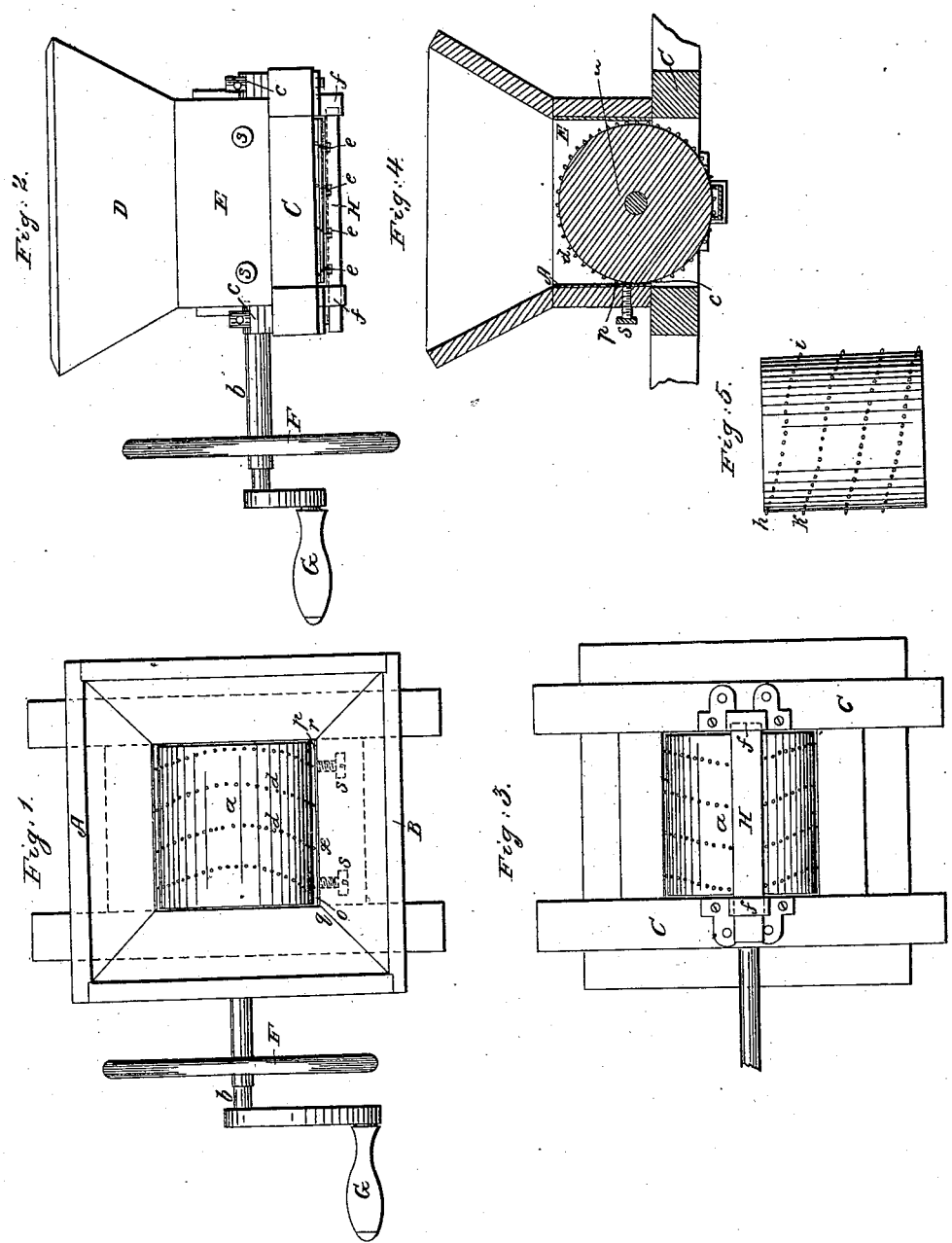

UNITED STATES PATENT OFFICE.

NATHAN SARGENT, OF CAMBRIDGEPORT, MASSACHUSETTS.

IMPROVEMENT IN MILLS FOR GRINDING SUGAR.

Specification forming part of Letters Patent No. 1,783, dated September 10, 1840.

*To all whom it may concern:*

Be it known that I, NATHAN SARGENT, of Cambridgeport, in Middlesex county, and State of Massachusetts, have invented new and useful Improvements in Mills for Grinding Sugar, which I denominate a "Self-Cleaning Sugar-Mill."

The said improvements, the principles thereof, and mode in which I have contemplated the application of the same by which they may be distinguished from other inventions of a like character, together with such parts thereof as I claim to be my invention, I have herein set forth in the following description and accompanying drawings herein referred to, which, taken in connection, form my specification.

Figures 1, 2, 3, 4 are different views of my sugar-mill, Fig. 1 being a representation looking down upon the hopper. Fig. 2 is an end view. Fig. 3 exhibits the machine turned bottom upward, and Fig. 4 is a vertical cross-section through A B, Fig. 1.

A cylinder, $a$, Figs. 1, 3, 4, is fixed on a horizontal shaft, $b$, the journals of which rest and revolve in suitable boxes or bearings, $c\,c$, Fig. 2, affixed or placed on the top of a bed-frame, C, Figs. 2, 3, 4. The cylinder $a$ is surrounded by a rectangular or other proper shaped box, E, Fig. 2, entirely open or without any top or bottom. A hopper, D, placed on the box E, receives the material to be ground. F, Figs. 1 and 2, is a fly-wheel, and G a handle on the shaft $b$, the latter serving to give a rotatory motion to the cylinder $a$. The cylinder has rows $d\,d$ of strong wire or metallic teeth inserted or driven into its surface, each of the rows entering into notches or spaces $e\,e\,e$, cut transversely in the upper part of a bar or scraper, H, Figs. 2 and 3, the said scraper being a common square or rectangular bar or piece of metal resting and moving longitudinally freely back and forth in suitable guides or supports, $f\,f$, Figs. 2, 3, and 4, and having its upper surface in close contact with that of the cylinder. Each of the rows of teeth of the cylinder is arranged around the periphery of the same in a double spiral line—that is to say, starting from a point, $h$, Fig. 5, the first row takes an inclined direction or curve around the semi-circumference of the cylinder, similar to a common screw, until it arrives at a point, $i$, in the circumference one hundred and eighty degrees from the point $h$. Thence the line retrogrades or inclines back in the same manner on the opposite semi-circumference to the point $h$ of starting. The point $k$ at the beginning of the next parallel row of teeth is directly opposite the point $i$, and the said row of teeth is arranged parallel and precisely similar to the first above mentioned, and so on with the others. Then, as has been heretofore described, as each row of teeth enters into or passes through a notch or space $e\,e\,e$ in the bar or scraper H, on revolving the cylinder by means of the handle G, the edges of the rows of teeth will bear against the sides of the notches and press the bar or scraper sidewise, or give it a reciprocal rectilinear motion; or, in other words, while the cylinder makes half a revolution on its axis the bar will be pressed forward by the semi-screws or rows of teeth, and will be returned or drawn back during the next half-revolution by the opposite semi-screws or rows of teeth. Thus the scraper is caused to slide back and forth in its supports $f\,f$, the spaces or those portions of the upper part of the said scraper between the notches and in contact with the surface of the cylinder effectually scraping off any sugar which may adhere to the cylinder between its rows of teeth, which teeth, as the cylinder is revolved, break up and pulverize the sugar as it passes between the same and the side $x$, Fig. 1, of the box E. This peculiar arrangement of the rows of teeth in a double spiral line, as above described, has the following effect on the sugar: While the cylinder makes half a revolution each point or tooth, from its peculiar arrangement in a curve, above mentioned, acts successively on the sugar and grinds or reduces it. Then, during the next half-revolution the teeth of the next adjacent row, retrograding, as before mentioned, act on the sugar in a similar manner, and thus the lumps intervening between the teeth and throat or space between the same and the inside of the box E, are ground up or reduced by the action of the teeth, the spiral position in which they are arranged causing each tooth to act successively on the same, and at the same time by the said arrangement of the teeth in the said curves, admitting the application of a scraper, H, which removes any sugar adhering to the surface of the cylinder, and prevents such an accumulation of the same thereon as takes place in most other kinds of grinding-mills. If the teeth were arranged on the circumference of the cylinder in circular rows, or in planes perpendicular to its axis, they would only crush the sugar on these lines, and the scraper H would be comparatively of no use; but as the teeth of each row are arranged in an advancing and retrograding helix on the cylinder, as above described, the sugar in contact with the whole surface of the cylinder is operated on, and the scraper effectually performs its office of removing any sugar which may adhere between each row of teeth.

It will also be seen that if the surface of the cylinder were studded with teeth projecting from all parts thereof without any such regular order of arrangement a scraper could not be applied, in the manner above set forth, to cleanse the surface of the cylinder; but as the scraper H is permitted to play loosely in its supports $f f$, so as to be easily moved longitudinally to and fro by the rows of teeth of the cylinder, it effectually operates to prevent an accumulation of sugar on the surface of the cylinder between the rows of teeth.

In order to regulate the width of the throat or opening $o\, p$, Fig. 1, and $p$, Fig. 4, (between the cylinder and the side of the box E,) a thin rectangular plate of steel or other metal, $q\, r$, Figs. 1 and 4, is confined by screws at its top $q$, Fig. 4, to the side. Thumb-screws $s\, s$, Figs. 1 and 4, inserted in the side of the box E and in rear of the plate $q\, r$, as seen in the drawings, serve, on being screwed up, to spring forward the lower and middle part of the plate $q\, r$, and thus regulate the width of the throat at pleasure.

Having thus described my improvement, I shall claim—

A cylinder having its teeth disposed in advancing and retrograding helices, in combination with a scraper, the whole being arranged and operating together substantially in the manner and for the purposes hereinabove mentioned and set forth.

In testimony that the above is a true description of my said invention and improvement I have hereto set my signature this 3d day of August, in the year of our Lord 1840.

NATHAN SARGENT.

Witnesses:
R. H. EDDY,
BENJAMIN BURTON.